(12) United States Patent
Ashida et al.

(10) Patent No.: US 6,699,976 B2
(45) Date of Patent: Mar. 2, 2004

(54) POLYAZO COMPOUND OR SALT THEREOF AND DYE-BASED POLARIZATION FILM CONTAINING THE SAME

(75) Inventors: Toru Ashida, Toyonaka (JP); Yoshiteru Ohta, Nara (JP); Narutoshi Hayashi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 2 days.

(21) Appl. No.: 10/189,173

(22) Filed: Jul. 5, 2002

(65) Prior Publication Data

US 2003/0098447 A1 May 29, 2003

Related U.S. Application Data

(63) Continuation-in-part of application No. 10/178,025, filed on Jun. 24, 2002, now abandoned.

(30) Foreign Application Priority Data

| Jun. 28, 2001 | (JP) | ............................ 2001-196170 |
| Sep. 19, 2001 | (JP) | ............................ 2001-284646 |
| Sep. 28, 2001 | (JP) | ............................ 2001-300863 |

(51) Int. Cl.[7] ............. C09B 31/08; C09B 31/20; C09B 33/22; C09B 45/28; F21V 9/14
(52) U.S. Cl. .............. 534/714; 534/717; 534/806; 534/811; 534/827; 534/829; 8/506; 252/585
(58) Field of Search ......................... 534/806

(56) References Cited

U.S. PATENT DOCUMENTS

| 5,318,856 | A | | 6/1994 | Misawa et al. ............ 428/524 |
| 5,354,512 | A | * | 10/1994 | Ogino et al. ............ 252/585 |
| 5,446,135 | A | | 8/1995 | Misawa et al. ............ 534/714 |
| 5,480,977 | A | * | 1/1996 | Ogino et al. ............ 534/717 |
| 5,700,296 | A | * | 12/1997 | Ogino et al. ............ 8/489 |
| 5,872,228 | A | * | 2/1999 | Kunde ............ 534/598 |
| 6,235,064 | B1 | * | 5/2001 | Ogino et al. ............ 8/489 |
| 6,399,752 | B1 | * | 6/2002 | Ohta et al. ............ 534/806 |

FOREIGN PATENT DOCUMENTS

| EP | 1203969 | | 5/2002 |
| JP | 5-295281 | | 11/1993 |
| JP | 9-302250 | | 11/1997 |
| JP | 11-218610 | * | 8/1999 |
| JP | 2001-27708 | | 1/2001 |
| JP | 2001-33627 | | 2/2001 |
| WO | WO 00/67069 | * | 11/2000 |

* cited by examiner

Primary Examiner—Fiona T. Powers
(74) Attorney, Agent, or Firm—Stevens, Davis, Miller & Mosher, L.L.P.

(57) ABSTRACT

A polyazo compound or salt thereof covering the region of from 500 to 580 nm and manifesting high initial polarization ability and represented by the following formulae (I) or (II):

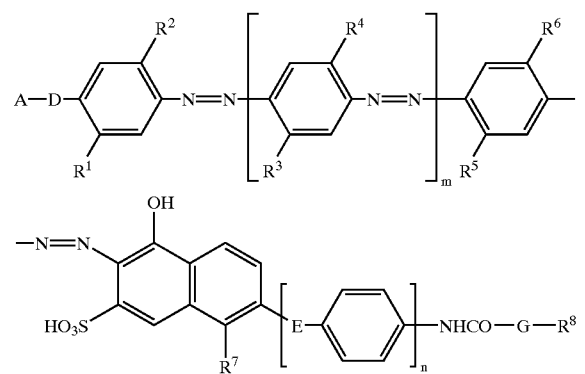

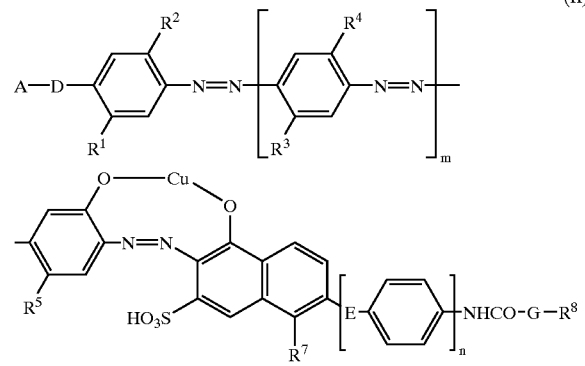

wherein,

A represents a phenyl having sulfo and/or carboxyl and optionally having a lower alkyl or lower alkoxy, or a naphthyl having 1 to 3 sulfos, $R^1$ to $R^6$ represent hydrogen, lower alkyl or alkoxy, m and n each independently represent 0 or 1, $R^7$ represents hydrogen or sulfo, D and E each independently represents —NHCO— or —N=N—, G represents —$CH_2$—, alkylene having 2–4 carbon atoms, phenylene or —CH=CH—, and $R^8$ represents sulfo, carboxyl or lower alkoxycarbonyl; is provided.

8 Claims, No Drawings

POLYAZO COMPOUND OR SALT THEREOF AND DYE-BASED POLARIZATION FILM CONTAINING THE SAME

CROSS-REFERENCE TO RELATED APPLICATION

This Application is a Continuation in Part of application Ser. No. 10/178,025, filed on Jun. 24, 2002 now abandoned, the entire disclosure of which is herein incorporated by reference.

BACKGROUND OF THE INVENTION

The present invention relates to a polyazo compound or a salt thereof, and a dye-based polarization film containing the same.

Dye-based Polarization films are produced by adding a dye covering the desired wave-length region as a polarization element into a polarization film substrate such as a drawn and oriented polyvinyl alcohol-based film, an oriented polyene-based film produced by de-hydrochloric acid of a polyvinyl chloride film or dehydration of a polyvinyl alcohol film, and the like. As an example of dyes covering the region of from 500 to 580 nm, a polyazo compound represented by the following formula is known (JP-A-5-295281, Example 1).

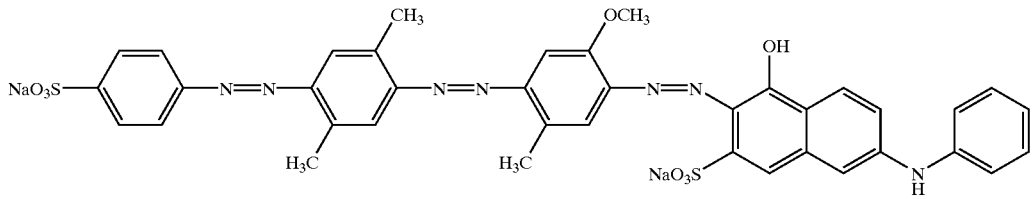

However, polarization films produced by using the known polyazo compound mentioned above are not completely sufficient yet from the view points of initial polarization ability, etc.

The object of the present invention is to provide a polyazo compound usable for producing a dye-based polarization film covering the region of from 500 to 580 nm and particularly excellent in Initial polarization ability.

The present inventors have conducted extensive studies, and, resultantly, they have found that a specific polyazo compound or salt thereof attains the above-mentioned object. Thus, the present invention was completed.

SUMMARY OF THE INVENTION

Namely, the present invention provides a polyazo compound or salt thereof represented by the following formulae (I) or (II):

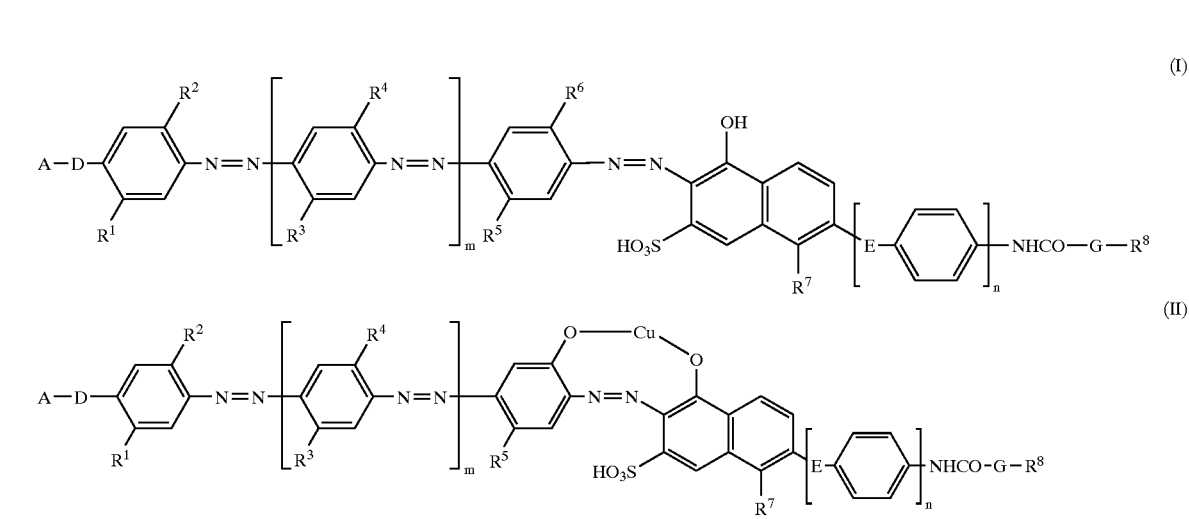

wherein,

A represents a phenyl having sulfo and/or carboxyl and optionally having a lower alkyl or lower alkoxy, or a naphthyl having 1 to 3 sulfos, $R^1$ to $R^6$ are the same or different and represent hydrogen, lower alkyl or lower alkoxy, m and n each independently represents 0 or 1.

$R^7$ represents hydrogen or sulfo,

D and E each independently represents —NHCO— or —N=N—,

G represents —CH$_2$—, alkylene having 2–4 carbon atoms, phenylene or —CH=CH—, and $R^8$ represents sulfo, carboxyl or lower alkoxycarbonyl, provide that, when G represent phenylene, n is 1.

DETAILED DESCRIPTION OF PREFERRED EMBODIMENTS

A in the above-mentioned formula (I) represents a naphthyl having 1 to 3 sulfos or a phenyl having sulfo and/or carboxyl and optionally having a lower alkyl or lower alkoxy. The lower alkyl or lower alkoxy is preferably a linear or branched group having 1 to 4 carbon atoms Specific examples of the lower alkyl include methyl, ethyl, propyl and the like. Specific examples of the lower alkoxy include methoxy, ethoxy, propoxy and the like As the phenyl represented by A, a phenyl having sulfo and/or carboxyl wherein the total number of sulfo and carboxyl is 1 or 2 is preferred. Examples of the phenyl include 2-, 3- or 4-sulfophenyl, 2-, 3- or 4-carboxyphenyl, 2,4- or 2,5-disulfophenyl, 3,5-dicarboxyphenyl, 2-carboxy-4- or -5-sulfophenyl, 2- or 3-methyl-4-sulfophenyl, and the like. Among them, a phenyl having sulfo is preferable from the view points of dyeing and 4-sulfophenyl is particularly preferable.

Examples of the naphthyl represented by A include 5-, 6-, 7- or 8-sulfo-2-naphthyl, 4-, 5-, 6- or 7-sulfo-1-naphthyl, 1,5-, 6,8-, 4,8-, 5,7- or 3,6-disulfo-2-naphthyl, 3,6- or 4,6-disulfo-1-naphthyl, and 1,5,7-, 3,6,8- or 4,6,8-trisulfo-2-naphthyl and the like. Among them, naphthyls having 2 to 3 sulfos are preferable from the view points of dyeing, and disulfo-2-naphthyls such as 1,5-, 6,8-, 4,8-, 5,7- or 3,6-disulfo-2-naphthyl and the like are particularly preferable.

$R^1$ to $R^6$ each independently represent hydrogen, lower alkyl or lower alkoxy. The lower alkyl or lower alkoxy is preferably a linear or branched group having 1 to 4 carbon atoms. Specific examples of the lower alkyl include methyl, ethyl, propyl and the like. Specific examples of the lower alkoxy include methoxy, ethoxy, propoxy and the like.

$R^1$ to $R^6$ preferably represent hydrogen or methyl.

$R^7$ represents hydrogen or sulfo, and preferably hydrogen.

$R^8$ represents sulfo, carboxyl or lower alkoxycarbonyl, and preferably lower alkoxycarbonyl, such as —CO—OCH$_3$. The lower alkoxy in the lower alkoxycarbonyl is preferably a linear or branched group having 1 to 4 carbon atoms. Specific examples of the lower alkoxy include methoxy, ethoxy, propoxy and the like. As $R^8$, methoxycarbonyl and ethoxycarbonyl are preferable, and particularly methoxycarbonyl is preferable.

G represents —CH$_2$—, alkylene having 2–4 carbon atoms, phenylene or —CH=CH—. Among them, —CH$_2$— and ethylene are preferable, and ethylene is particularly preferable m and n each independently represents 0 or 1, provide that, when G represent phenylene, n is 0.

A polyazo compound of the formula (I) or a salt thereof can be produced, for example, by the following method.

First, a compound of the following formula (VII):

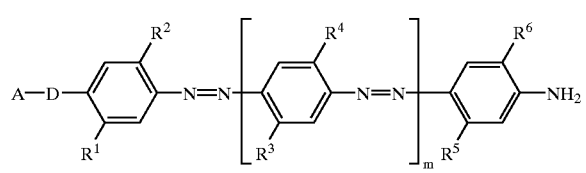

(VII)

wherein, $R^1$–$R^6$, A and D are as defined above are diazotized by reacting with sodium nitrite in an acidic aqueous medium under a condition of 5 to 4° C.

Then, the resulted diazo compound is reacted with an amide compound of the following formula (III):

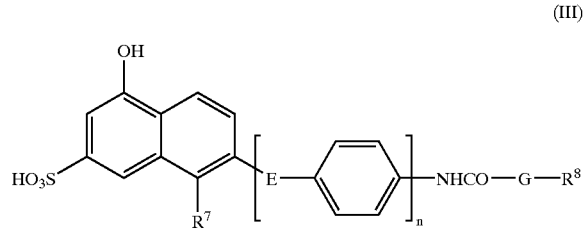

(III)

wherein, $R^7$, $R^8$, E, G and n are as defined above to obtain the polyazo compound of the formula (I) or a salt thereof.

A compound of the formula (VII) wherein m=1 or a salt thereof can be produced, for example, by the following method.

First, an azo compound of the following formula (IV):

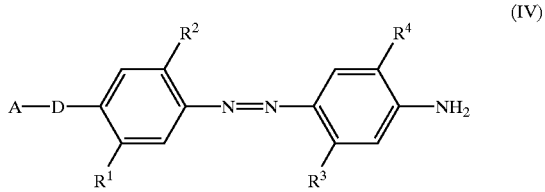

(IV)

wherein, $R^1$–$R^4$, A and D are as defined above, is diazotized by reacting with sodium nitrite in an acidic aqueous medium under a condition of 5 to 40° C. The resulted diazotized compound is reacted with an aniline compound of the following formula (V):

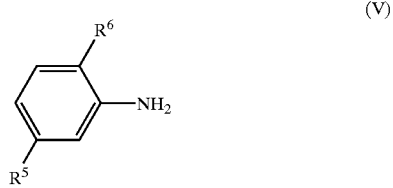

(V)

wherein, $R^5$ and $R^6$ are as defined above, in an aqueous medium under conditions of 5 to 40° C. and pH from 6 to 11, to obtain a compound of the formula (VII) wherein m=1 or a salt thereof.

A compound of the formula (VII) wherein m=0 or a salt thereof can be produced, for example, by reacting a compound obtained by diazotizing a compound of the following formula (VI):

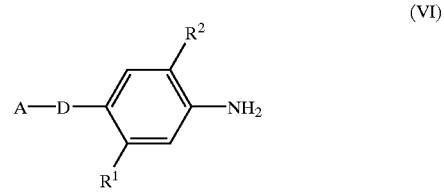

(VI)

wherein, $R^1$, $R^2$, A and D are as defined above, with the above aniline compound of formula (V).

An amide compound of the formula (III) can be produced, for example, by reacting a naphtol compound of the following formula (IIa):

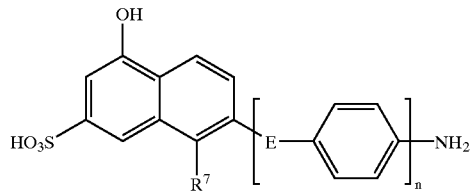
(IIa)

wherein E, n and $R^7$ are as defined above, with an acid anhydride or acid halide which is capable of; introducing —CO—G—$R^8$ (wherein, G and $R^8$ are as defined above) into —$NH_2$ group in the formula (IIa).

A polyazo compound of the formula (II) or a salt thereof can be produced by changing a polyazo compound of the formula (I) wherein $R^6$ is methoxy to a copper complex thereof according to a conventional method.

Examples of salts of polyazo compound of the formula (1) and salts of polyazo compound of the formula (II) include (1)
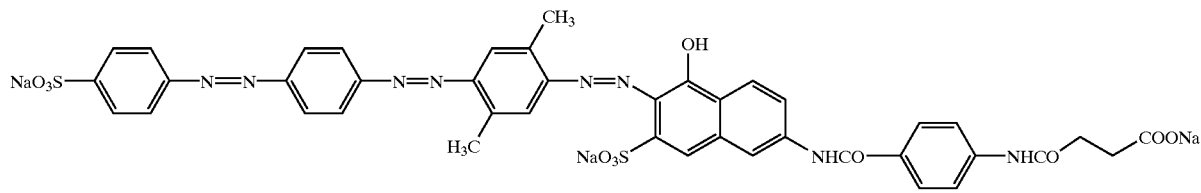

(2)
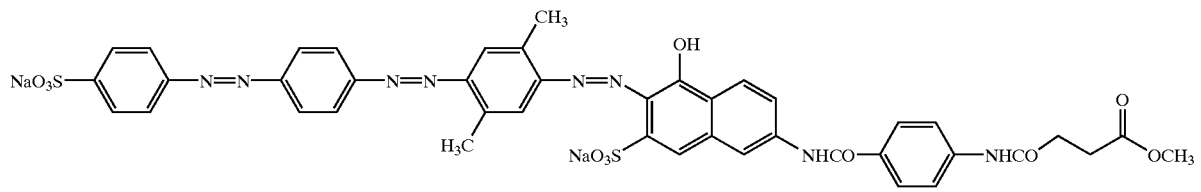

(3)
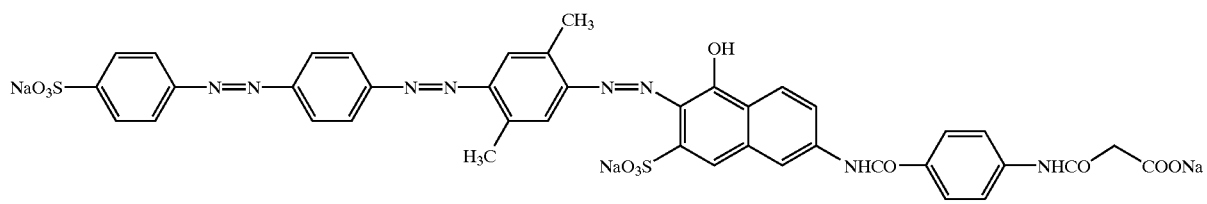

(4)
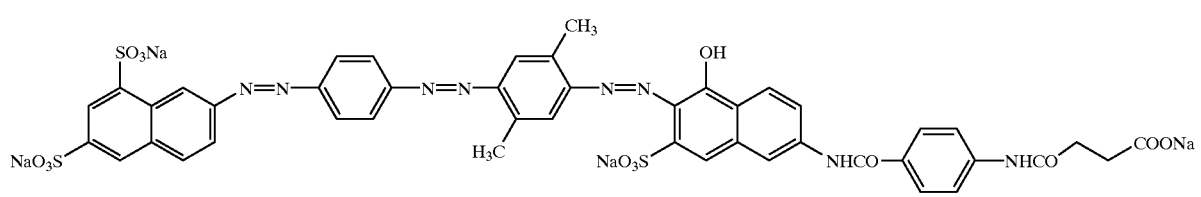

(5)
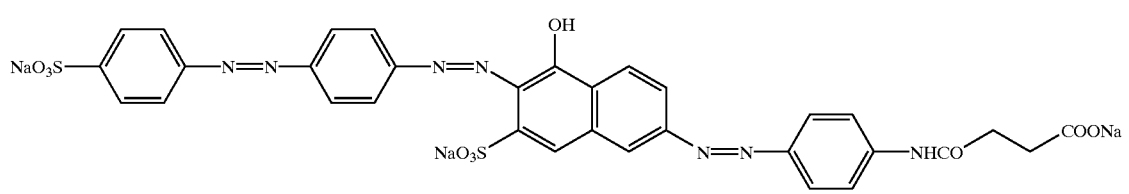

-continued
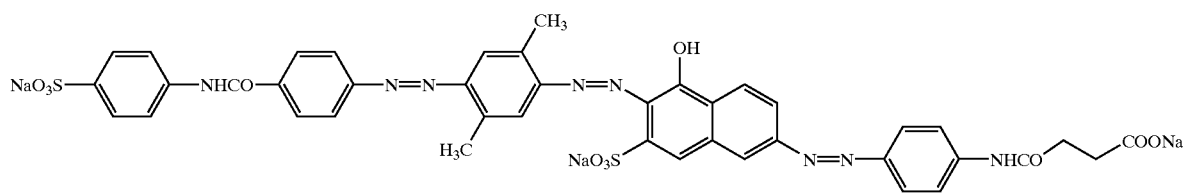
(6)
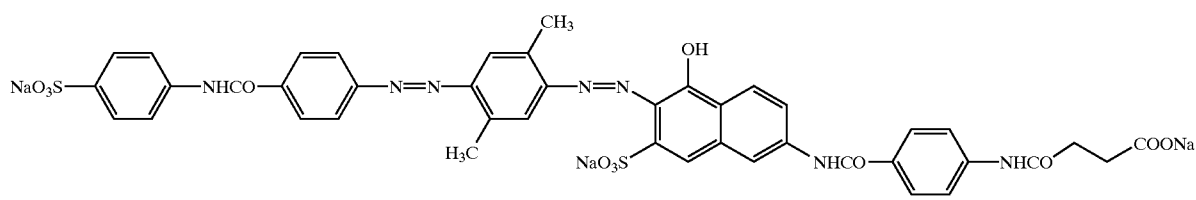
(7)
(8)
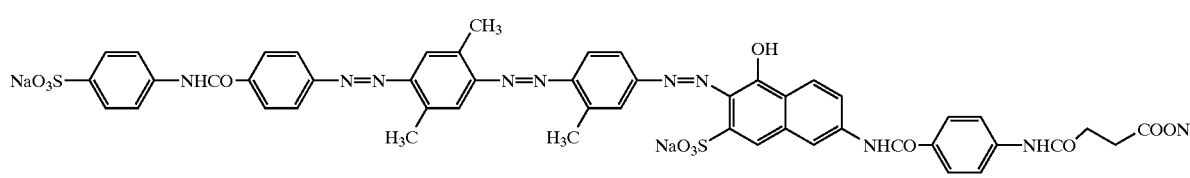
(9)
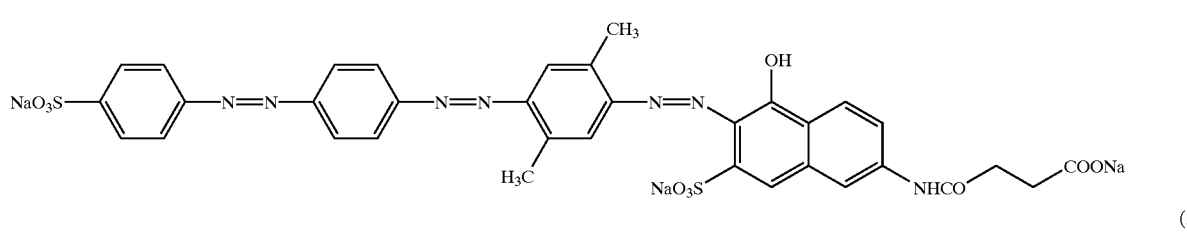
(10)
(11)
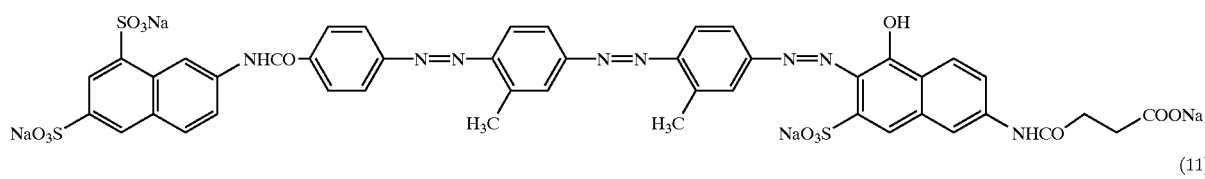
(12)
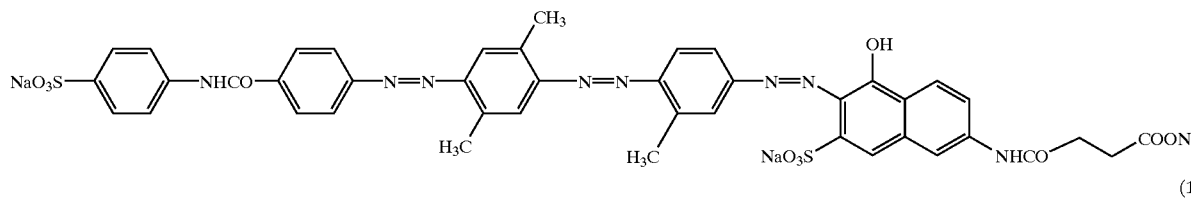
(13)
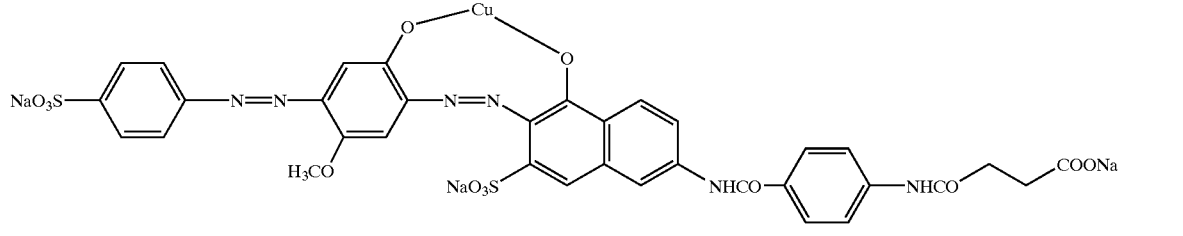

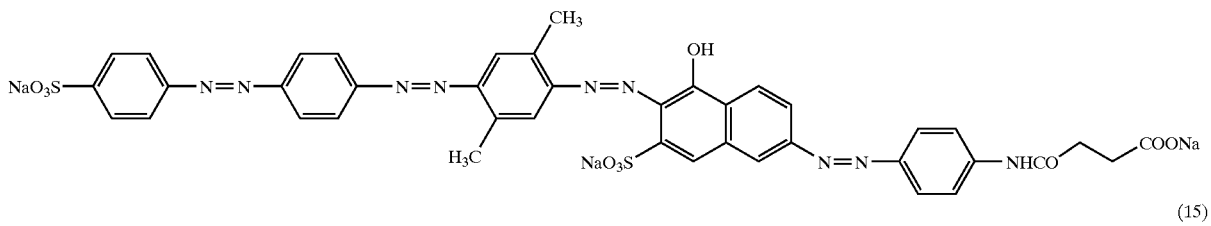

(14)

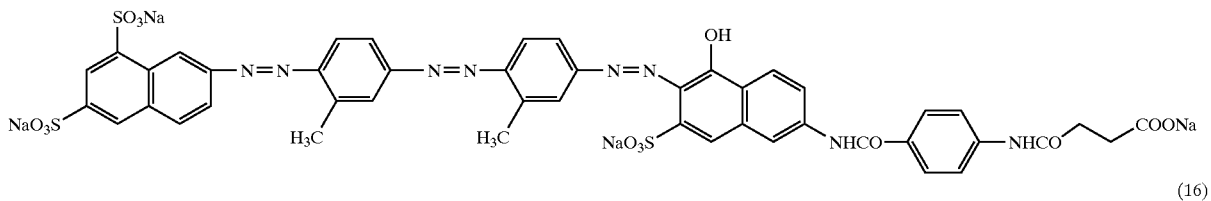

(15)

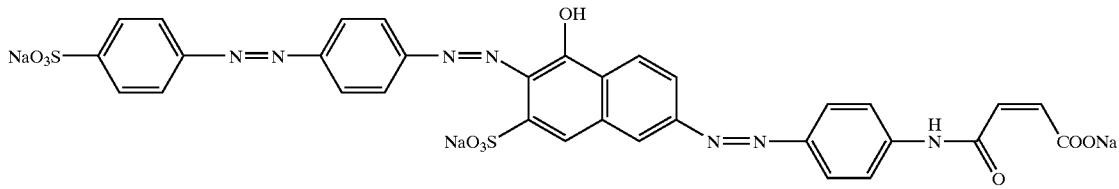

(16)

and the like.

As examples of the salt of a polyazo compound (I) and the salt of a polyazo compound (II), alkali metal salts such as a lithium salt, sodium salt and potassium salt, an ammonium salt, and organic amine salts such as an ethanolamine salt and alkylamine salt, and the like are listed. When a polyazo compound of the formula (I) and/or a polyazo compound of the formula (II) is added into a polarization film substrate, a compound in the form of a sodium salt is preferably used.

When a polyazo compound of the formula (I), a polyazo compound of the formula (II) or salt thereof is added into a polarization film substrate to give a polarization film, hue can be modified and polarization ability can be improved by combination with another organic dye. As the organic dye used in this case, any dye can be used as long as it has high dichroism. A polarization film suitably used in a liquid crystal projector can be produced, using a dye excellent in light resistance.

Specific examples of such organic dyes include the following compounds expressed by Color Index Generic Name.
C. I. Direct Yellow 12
C. I. Direct Yellow 28
C. I. Direct Yellow 44
C. I. Direct Orange 26
C. I. Direct Orange 39
C. I. Direct Orange 107
C. I. Direct Red 2
C. I. Direct Red 31
C. I. Direct Red 79
C. I. Direct Red 81
C. I. Direct Red 247

The dye-based polarization film of the present invention can be produced by adding a dichromatic dye comprising a polyazo compound of the formula (I), a polyazo compound of the formula (II) or salt thereof, or a dichromatic dye further comprising other organic dye, into a polymer film, polarization film substrate, by a known method. Examples of this polymer film include polymer films made of polyvinyl alcohol-based resins, polyvinyl acetate resins, ethylene/ vinyl acetate (EVA) resins, nylon resin, polyester resins or the like. Examples of the polyvinyl alcohol-based resin herein referred to include a partial or complete saponified polyvinyl acetate, that is polyvinyl alcohol; saponified substances of copolymers of vinyl acetate with other copolymerizable monomers, for example, olefins such as ethylene and propylene, unsaturated carboxylic acids such as crotonic acid, acrylic acid, methacrylic acid and maleic acid, unsaturated sulfonic acids, vinyl ethers, and the like, such as saponified EVA resins; polyvinyl formal and polyvinyl acetal obtained by denaturing polyvinyl alcohol with an aldehyde, and the like. As the polarization film substrate, polyvinyl alcohol-based films, particularly, a polyvinyl alcohol film is suitably used from the standpoints of adsorbing property and orientation property of a dye.

For adding a dichromatic dye into such a polymer film, a method of dyeing a polymer film is usually adopted. Dyeing can be effected, for example, according to the following method. First, a dichromatic dye is dissolved in water to prepare a dye bath. The concentration of a dye in the dye bath is not particularly restricted, but usually selected in the range from 0.0001 to 10% by weight. If necessary, a dyeing aid may be used. For example, it is suitable to use sodium sulfate in an amount of 0.1 to 10% by weight in a dye bath. A polymer film is immersed into the dye bath thus prepared, and dyeing is effected. The dyeing temperature is preferably from 40 to 80° C. Orientation of a dye is conducted by stretching a polymer film. As the stretching method, any method such as a wet method, dry method and the like may be adopted, for example. Stretching of a polymer film may be conducted before dyeing or after dyeing.

A polymer film obtained by adding and orientating a dye is subjected, if necessary, to a post treatment such as boric acid treatment and the like according to a known method. Such a post treatment is effected for improving light transmittance, degree of polarization and endurance of a polarization film. Though conditions of the boric acid treatment differ depending on the kind of a polymer film used and the kind of a dye used, the boric acid treatment is generally effected using a boric aced aqueous solution having a concentration of from 1 to 15% by weight, preferably from 5 to 10% by weight at a temperature ranging from 30 to 80° C. preferably from 50 to 80° C. Further, if necessary, a fix treatment may be together conducted using an aqueous solution containing a cationic polymer compound.

A protective film excellent in optical transparency and mechanical strength can be pasted on one surface or both surfaces of thus obtained dye-based polarization film, to give a polarization plate. The material forming a protective film may be which conventionally used For example, films composed of a fluorine resin such as an ethylene tetrafluoride/propylene hexafluoride copolymer, polyester-based films, polyolefin-based films, polyamide-based films and the like may be used, in addition to cellulose acetate-based films and acrylic films.

The following examples illustrate the present invention further in detail, but should not be construed to restrict the scope of the invention at all. "%" and "parts" in the examples are by weight unless otherwise stated.

EXAMPLE 1

Into a mixed solvent of 3500 parts of water and 3500 parts of N-methyl-2-pyrrolidinone was added 358 parts of a naphtol compound represented by the following formula (17):

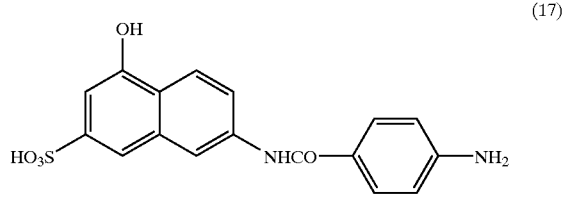

(17)

and the resultant mixture was stirred at 10° C. Then, while maintaining pH at 5.5 with aqueous sodium hydroxide solution, 300 parts of succinic anhydride was added thereto over 2 and half hours. After completion of the addition, the reaction mixture was stirred for 1 more hour to obtain a naphtol compound represented by the following formula (18).

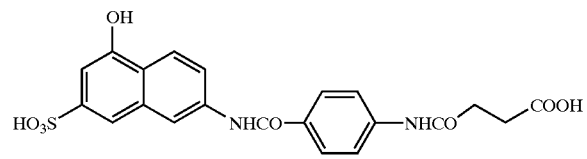

(18)

Separately, 143 parts of a bisazo compound represented by the following formula (19):

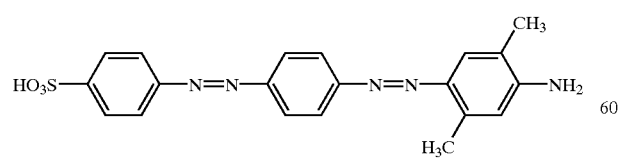

(19)

and 30 parts of sodium nitrite were added to 1500 parts of water. Then, 120 parts of 35% hydrochloric acid was added thereto and the mixture was stirred for 2 hours at room temperature, to obtain a solution of a diazo compound.

Into a mixed solvent of 700 parts of water and 700 parts of N-methyl-2-pyrrolidinone was added 230 parts of the above-obtained naphtol compound represented by the formula (18), and the resultant mixture was stirred at 10° C. Then, while maintaining pH at 7 with aqueous sodium carbonate solution, the solution of a diazo compound obtained above was added thereto over 1 hour. After completion of the addition, the reaction mixture was stirred for 1 more hour and a coupling reaction was conducted to obtain a polyazo compound represented by the above formula (1), $\lambda$ max of this polyazo compound revealed 549 nm in an aqueous medium.

EXAMPLE 2

A salt of a polyazo compound of the above formula (2) was obtained in the same manner as in Example 1 except that methyl-4-chloro-4-oxobutylate was used instead of the succinic anhydride used in Example 1. This salt manifested a $\lambda$ max of 546 nm in an aqueous medium.

EXAMPLE 3

Into a mixed solvent of 3500 parts of water and 3500 parts of N-methyl-2-pyrrolidinone was added 358 parts of a naphtol compound represented by the formula (17), and the resultant mixture was stirred at 10° C. Then, while maintaining pH at 5.5 with aqueous sodium hydroxide solution, 360 parts of methyl chloride malonate was added thereto over 2 and half hours. After completion of the addition, the reaction mixture was stirred for 1 more hour, and then hydrolysis was conducted to obtain a naphtol compound represented by the following formula (20):

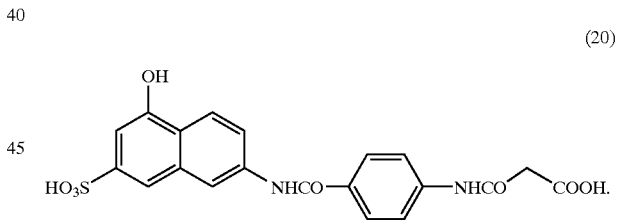

(20)

A salt of a polyazo compound of the above formula (3) was obtained in the same manner as in Example 1 except that the naphtol compound of the formula (20) was used instead of the compound of the formula (18) used in Example 1. This salt manifested a $\lambda$ max of 550 nm in an aqueous medium.

EXAMPLE 4

A salt of a polyazo compound of the above formula (4) was obtained in the same manner as in Example 1 except that a bisazo compound represented by the following formula (21):

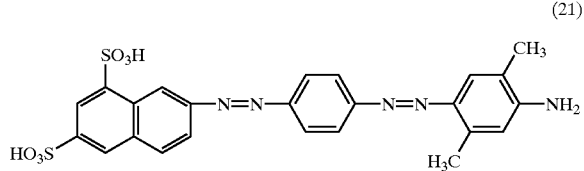

(21)

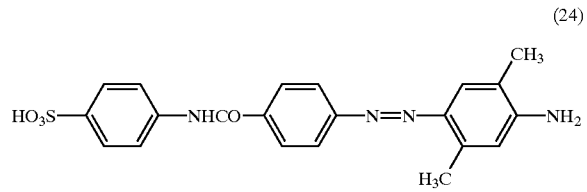

(24)

was used instead of the bisazo compound represented by the formula (19). This salt manifested a λ max of 549 nm in an aqueous medium.

EXAMPLE 5

A salt of a polyazo compound of the above formula (5) was obtained in the same manner as in Example 1 except that a monoazo compound represented by the following formula (22):

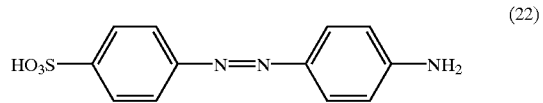

(22)

was used instead of the bisazo compound represented by the formula (19) and a naphtol compound represented by the following formula (23):

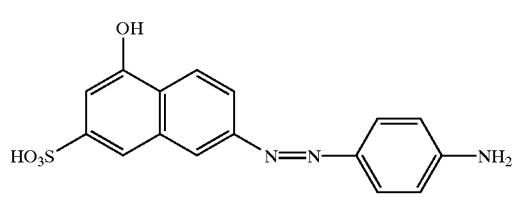

(23)

was used instead of the naphtol compound represented by the formula (17). This salt manifested a λ max of 550 nm in an aqueous medium.

EXAMPLE 6

A salt of a polyazo compound of the above formula (6) was obtained in the same manner as in Example 5 except that an azo compound represented by the following formula (24):

was used instead of the monoazo compound represented by the formula (22) used in Example 5. This salt manifested a λ max of 565 nm in an aqueous medium.

EXAMPLE 7

A salt of a polyazo compound of the above formula (7) was obtained in the same manner as in Example 6 except that a naphtol compound represented by the above formula (17) was used instead of the naphtol compound represented by the formula (23). This salt manifested a λ max of 537 nm in an aqueous medium.

EXAMPLE 8

A salt of a polyazo compound of the above formula (8) was obtained in the same manner as in Example 6 except that an azo compound represented by the following formula (25)

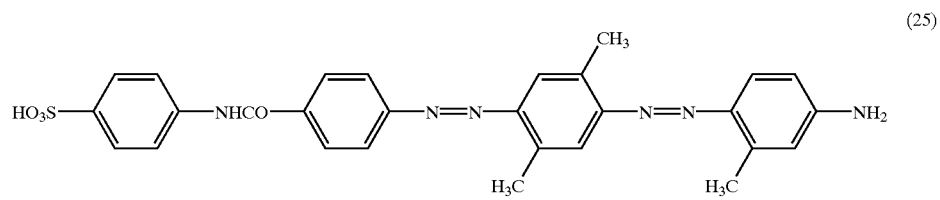

(25)

was used instead of the azo compound represented by the formula (24) used in Example 6. This salt manifested a λ max of 539 nm in an aqueous medium

EXAMPLE 9

A salt of a polyazo compound of the above formula (9) was obtained in the same manner as in Example 1 except that a naphtol compound represented by the following formula (26)

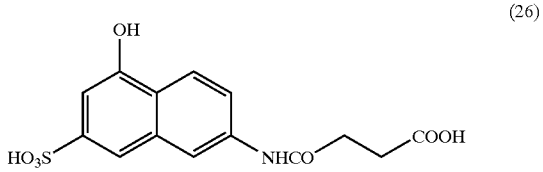

(26)

was used instead of the naphtol compound represented by the formula (18) used in Example 1, This salt manifested a λ max of 550 nm in an aqueous medium.

EXAMPLE 10

A salt of a polyazo compound of the above formula (10) was obtained in the same manner as in Example 1 except that an azo compound represented by the following formula (27)

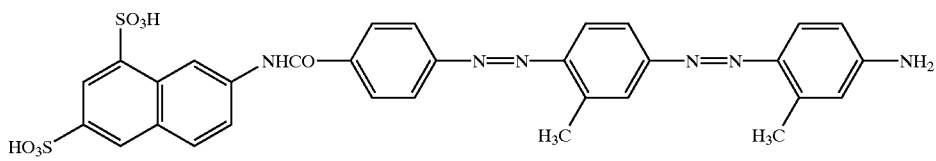

(27)

was used instead of the azo compound represented by the formula (19) used in Example 1. This salt manifested a λ max of 537 nm in an aqueous medium.

EXAMPLE 11

A salt of a polyazo compound of the above formula (11) was obtained in the same manner as in Example 10 except that an azo compound represented by the formula (24) was used instead of the azo compound represented by the formula (27) used in Example 10. This salt manifested a λ max of 537 nm in an aqueous medium.

EXAMPLE 12

A polyvinyl alcohol film [Kuraray Vinylon #7500, manufactured by Kuraray Co., Ltd.] having a thickness of 75 μm was drawn along a longitudinal axis at a magnification ratio of 5, to give a polarization film substrate This polyvinyl alcohol film was kept under strained condition and immersed in an aqueous solution containing a salt of a polyazo compound of the formula (1) obtained in Example 1 in a concentration of 0.025% and sodium sulfate (dyeing aid) in a concentration of 0.2% at 70° C. Then, the film was immersed in a 7.5% boric acid aqueous solution at 78° C. for 5 minutes. The resulted film was removed from the solution, washed with water of 20° C. for 20 seconds, and dried at 5° C. to obtain a polarization film This polarization film had a λ max (wavelength at which transmittance along stretching direction of a film is minimum, the same in the following.) of 550 nm, had high degree of polarization, and manifested durability over a long time even under conditions of high temperature and high humidity The film was excellent also in light resistance to exposure for a long period of time.

EXAMPLE 13

A polyvinyl alcohol film [Kuraray Vinylon #7500, manufactured by Kuraray Co., Ltd.] having a thickness of 75 μm was drawn along a longitudinal axis at a magnification ratio of 5, to give a polarization film substrate. This polyvinyl alcohol film was kept under strained condition and immersed in an aqueous solution adjusted at pH 11 and containing a salt of a polyazo compound of the formula (1) obtained in Example 1 in a concentration of 0.025% and sodium sulfate (dyeing aid) in a concentration of 0.2% at 70° C. Then, the film was immersed in a 7.5% boric acid aqueous solution at 78° C. for 5 minutes. The resulted film was removed from the solution, washed with water of 20° C. for 20 seconds, and dried at 50° C. to obtain a polarization film. This polarization film had a λ max of 560 nm, had high degree of polarization, and manifested durability over a long time even under conditions of high temperature and high humidity. The film was excellent also in light resistance to exposure for a long period of time.

EXAMPLE 14

A polarization film was obtained according to the same manner as in Example 12 except that the salt of polyazo compound was changed to a salt of polyazo compound described in the following Table 1. The resulted polarization film had a λ max as described in Table 1. This polarization film had high degree of polarization, and manifested durability over a long time even under conditions of high temperature and high humidity. The film was excellent also in light resistance to exposure for a long period of time.

TABLE 1

| Salt of polyazo compound | λ max |
| --- | --- |
| Salt of compound of the formula (2) | 550 nm |
| Salt of compound of the formula (3) | 550 nm |
| Salt of compound of the formula (4) | 550 nm |
| Salt of compound of the formula (5) | 580 nm |
| Salt of compound of the formula (6) | 560 nm |
| Salt of compound of the formula (7) | 550 nm |
| Salt of compound of the formula (8) | 540 nm |
| Salt of compound of the formula (9) | 550 nm |
| Salt of compound of the formula (10) | 540 nm |
| Salt of compound of the formula (11) | 540 nm |

The dye-based polarization film containing a polyazo compound or a salt thereof according to the present invention covers the region of from 500 to 580 nm and manifests high polarization ability, particularly initial polarization ability. Therefore, the film is suitable for uses of liquid projectors, and the like. Further, the dye-based polarization film according to the present invention is excellent in durability under conditions of high temperature and high humidity. Therefore, the film is suitable for a display device in car, such as car navigations and the like.

What is claimed is:

1. A polyazo compound or salt thereof represented by the following formulae (I) or (II):

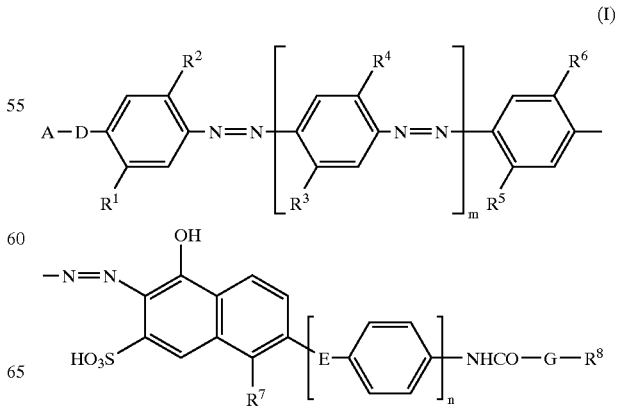

-continued

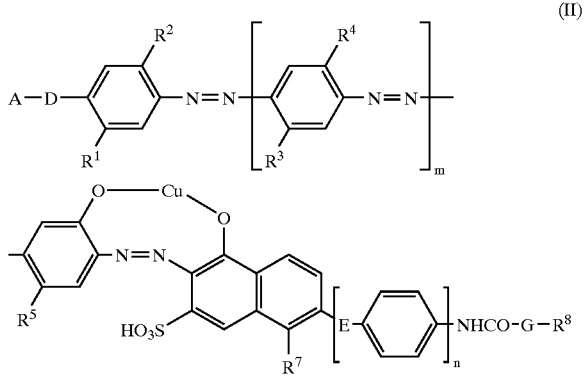

(II)

wherein,
A represents a phenyl having sulfo and/or carboxyl and optionally having a lower alkyl or lower alkoxy, or a naphthyl having 1 to 3 sulfos,
$R^1$ to $R^6$ are the same or different and represent hydrogen, lower alkyl or lower alkoxy,
m and n each independently represents 0 or 1,
$R^7$ represents hydrogen or sulfo,
D and E each independently represents —NHCO— or —N=N—,
G represents —CH$_2$—, alkylene having 2–4 carbon atoms, phenylene or —CH=CH—,
and $R^8$ represents sulfo, carboxyl or lower alkoxycarbonyl, provide that, when G represent phenylene, n is 0.

2. The polyazo compound or salt thereof according to claim 1 wherein A represents 2-naphthyl having 2 to 3 sulfos or a phenyl having 1 to 2 groups selected from sulfo and carboxyl.

3. The polyazo compound or salt thereof according to claim 1 wherein $R^1$ to $R^6$ each independently represent hydrogen or methyl.

4. The polyazo compound or salt thereof according to claim 1 wherein G represents —CH$_2$— and ethylene.

5. The polyazo compound or salt thereof according to claim 1 wherein D represents —N=N—, G represents —CH$_2$— and ethylene, m is 0 and n is 1.

6. The polyazo compound or salt thereof according to claim 1 wherein D represents —N=N—, G represents ethylene, $R^8$ represents —CO—OCH$_3$, m is 0 and n is 1.

7. A dye-based polarization film obtainable by adding the polyazo compound or salt thereof according to claim 1 into a polarization film substrate.

8. The dye-based polarization film according to claim 7 wherein the polarization film substrate is a polymer film made of a polyvinyl alcohol-based resin.

* * * * *